(12) United States Patent
Haecker

(10) Patent No.: US 8,531,404 B2
(45) Date of Patent: Sep. 10, 2013

(54) DISPLAY ASSEMBLY AND A FUEL DISPENSING UNIT

(75) Inventor: Russell Haecker, Round Rock, TX (US)

(73) Assignee: Dresser, Inc., Addison, TX (US)

( * ) Notice: Subject to any disclaimer, the term of this patent is extended or adjusted under 35 U.S.C. 154(b) by 220 days.

(21) Appl. No.: 12/897,507

(22) Filed: Oct. 4, 2010

(65) Prior Publication Data

US 2012/0081609 A1    Apr. 5, 2012

(51) Int. Cl.
*G06F 3/02*    (2006.01)

(52) U.S. Cl.
USPC .............................. 345/168; 222/23; 400/472

(58) Field of Classification Search
USPC .................. 345/1.1–1.3, 173–184; 348/373, 348/794; 222/23–51; 361/679.01–679.3; 455/575.1–575.8; 312/9.1–9.64; 400/472–496
See application file for complete search history.

(56) References Cited

U.S. PATENT DOCUMENTS

| | | | |
|---|---|---|---|
| 5,493,690 A * | 2/1996 | Shimazaki | 455/575.3 |
| 6,492,978 B1 * | 12/2002 | Selig et al. | 345/173 |
| 7,020,541 B2 * | 3/2006 | Wilson | 700/223 |
| 7,499,040 B2 * | 3/2009 | Zadesky et al. | 345/204 |
| 7,628,701 B2 * | 12/2009 | Wells | 463/37 |
| 2003/0235452 A1 | 12/2003 | Kraus et al. | |
| 2004/0090426 A1 * | 5/2004 | Bourdelais et al. | 345/173 |

FOREIGN PATENT DOCUMENTS

| | | |
|---|---|---|
| EP | 2090971 A1 | 8/2009 |
| WO | 03/088164 A1 | 10/2003 |
| WO | WO 2012/047835 A1 | 4/2012 |

OTHER PUBLICATIONS

PCT Search Report and Written Opinion dated Feb. 8, 2012 from corresponding Application No. PCT/US2011/054690.

* cited by examiner

*Primary Examiner* — Liliana Cerullo
(74) *Attorney, Agent, or Firm* — Hiscock & Barclay LLP

(57) ABSTRACT

According to the present inventive concept there is provided a display assembly for a fuel dispensing unit, comprising: a display, a substantially transparent screen arranged between the display and an ambient environment such that the display is visible through the screen, comprising a first screen portion and a second screen portion movably arranged, in relation to the first screen portion, between a first position and a second position distinct from the first position. There is also provided a fuel dispensing unit.

14 Claims, 5 Drawing Sheets

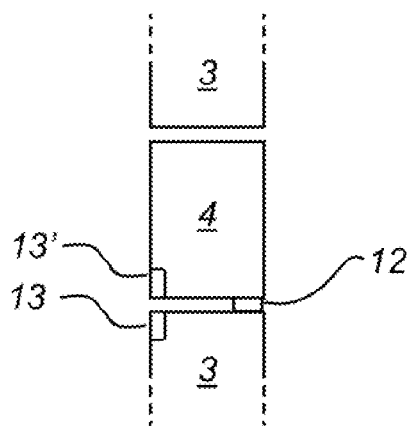 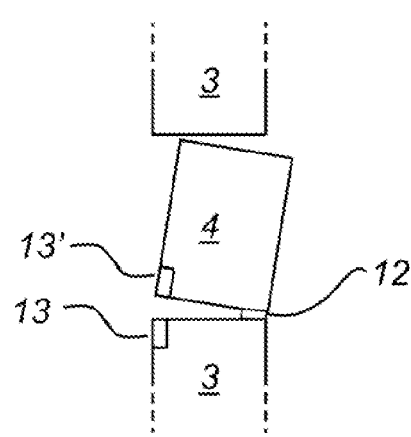
Fig. 5a  Fig. 5b
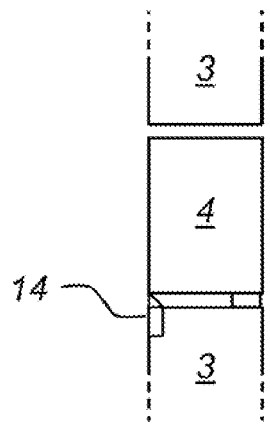 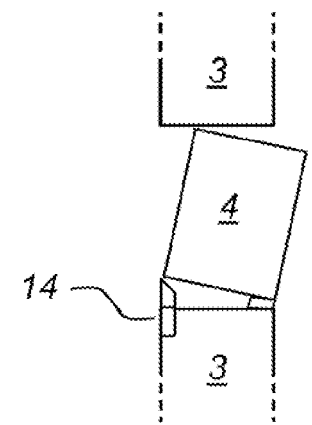
Fig. 6a  Fig. 6b
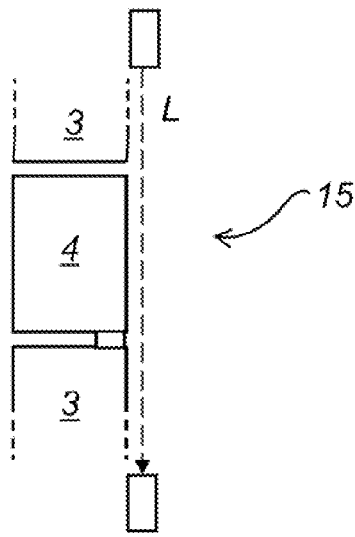 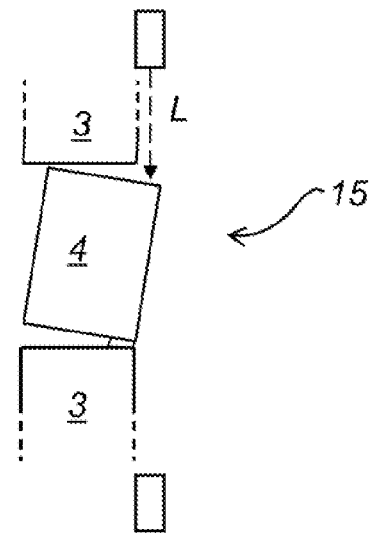
Fig. 7a  Fig. 7b

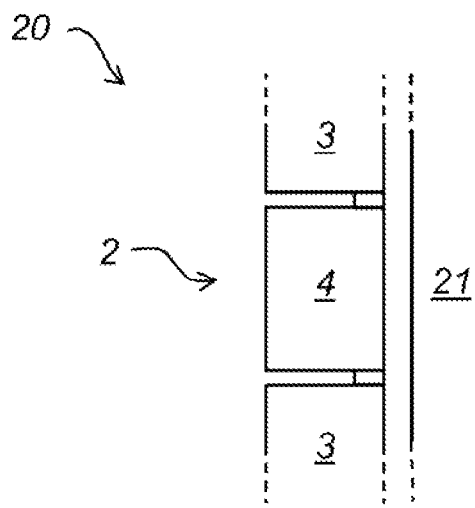
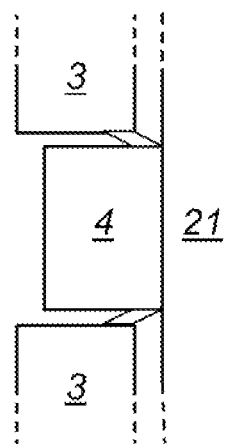
Fig. 8a          Fig. 8b
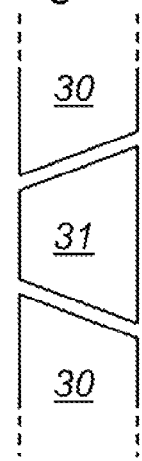
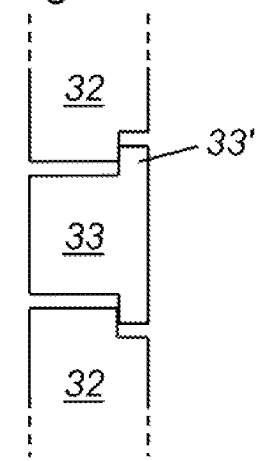
Fig. 9          Fig. 10
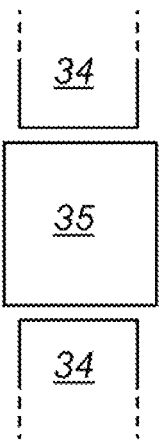
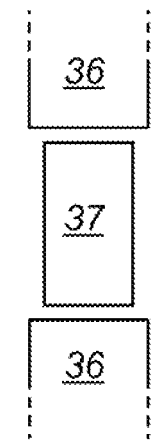
Fig. 11          Fig. 12

DISPLAY ASSEMBLY AND A FUEL DISPENSING UNIT

TECHNICAL FIELD

The present inventive concept generally relates to a display assembly and specifically to a display assembly comprising a display and a screen. The present inventive concept further relates to a fuel dispensing unit comprising a display assembly.

BACKGROUND

Today it is common to be presented with information on a display when using a terminal such as a transaction terminal, a cash dispenser, a ticket machine or the like at e.g. a train station or an airport, or a terminal at a fuel dispensing unit at a petrol station. The terminals may allow user interaction by pressing buttons, or if the display is a touch sensitive display, by touching the display at specified positions.

In order to make the display visible to a user, and in case of a touch sensitive display also accessible by the user, the display will be subject to an ambient environment in which substances such as liquids or grease may get in contact with the display and user interaction may wear the display.

SUMMARY OF THE INVENTIVE CONCEPT

In one or more embodiments of the present inventive concept there is provided a display assembly for a fuel dispensing unit, comprising:
  a display,
  a substantially transparent, or transparent, screen arranged between the display and an ambient environment such that the display is visible through the screen, comprising a first screen portion and a second screen portion movably arranged, in relation to the first screen portion, between a first position and a second position distinct from the first position.

By providing the transparent, or transparent, screen between the display and an ambient environment, the wear and tear of the display may be reduced. Moreover, by the partitioning of the screen into a first screen portion and a second screen portion movably arranged in relation to the first screen portion the display assembly enables convenient and tactile interaction with the display assembly in many different ways as will be understood in the following.

The first screen portion may be arranged at a substantially fixed position in relation to the display.

The first screen portion may comprise an opening in which the second screen portion is arranged.

The second screen portion may be arranged to be movable towards the display.

The second screen portion may be pivotably arranged in relation to the first screen portion.

According to one embodiment, the display assembly further comprises a detector configured to provide a signal in response to the second screen portion assuming the second position. This may enable a user to interact with the display assembly, e.g. by issuing a command or making a selection when prompted by information presented on the display. The movable arrangement of the second screen portion enables tactile interaction with the display assembly while direct contact between a user and the display may be avoided.

According to one embodiment the detector is arranged at the screen. It may thus be possible to enable user interaction with the display assembly even if the display is not touch sensitive.

According to one embodiment the detector comprises a switch for cooperation with the second screen portion. The position of the second screen portion may thereby be easily determined.

According to one embodiment the detector comprises a magnetic switch arranged at the first and the second screen portion. A magnetic switch may be formed such that any sensitive/active parts thereof may be encapsulated and thus protected from external effects.

According to one embodiment the magnetic switch is arranged on the first screen portion. The second screen portion may further comprise a permanent magnet for cooperation with the magnetic switch.

According to one embodiment the magnetic switch is arranged on the second screen portion. The first screen portion may further comprise a permanent magnet for cooperation with the magnetic switch.

According to one embodiment the detector comprises an optical switch assembly. Such a detector need not include any moving parts and may hence present a high operational reliability.

According to one embodiment the display is a touch sensitive display. The screen may thus protect the display if a user interacts with the display assembly using sharp or hard objects which could potentially scratch the display, e.g. a coin, a key, the tip of a nozzle of a fuel dispensing unit etc. However, the movably arranged second screen portion may still allow user interaction with the display assembly.

According to one embodiment the second position is such that the second screen portion engages with the display and the display is configured to detect an engagement with the second screen portion. A user may thus interact with the display assembly by pressing the second screen portion until the second screen portion makes contact with the display.

According to one embodiment the display is configured to detect an electric coupling between an object touching the second screen portion and the display. The object may for example be a finger of the user. This enables a user to interact with the display assembly without pushing the second screen portion all the way until it engages with the display.

According to one embodiment the second screen portion comprises a conductor and the display is configured to detect an electric coupling between the conductor and the display. This may increase the sensitivity of the detection by increasing the strength of the electric coupling between the display second screen portion.

In one or more embodiments, there may be provided a fuel dispensing unit comprising:
  a nozzle for dispensing fuel, and
  a display assembly, comprising:
  a display, and
  a substantially transparent, or transparent, screen arranged between the display and an ambient environment such that the display is visible through the screen, comprising a first screen portion and a second screen portion movably arranged, in relation to the first screen portion, between a first and a second position distinct from the first position.

The display assembly may be especially useful in the conditions at a petrol station where users are likely to use hard objects such as car keys or the nozzle of the fuel dispensing unit when interacting with the display assembly. The further details and advantages discussed above in connection with the previous aspect may apply correspondingly to this aspect wherefore reference is made to the discussion above.

Additionally, it should be noted that the substantially transparent screen may constitute a separate aspect. According to this separate aspect there is provided a substantially transparent, or transparent, screen for arrangement between a display and an ambient environment such that the display is visible through the screen, the screen comprising a first screen portion and a second screen portion movably arranged, in relation to the first screen portion, between a first position and a second position distinct from the first position. In connection with all embodiments described herein, it should be understood that each screen portion may be substantially transparent, transparent, or may be transparent, substantially transparent, and/or opaque at different times. For example, the screen may be opaque during all or a portion of the time that the display contains no information to be presented to a consumer.

The screen may thus be used both for providing non-touch sensitive displays with touch display functionality and for protecting touch sensitive displays such that wear may be reduced while maintaining the touch display functionality of the display.

BRIEF DESCRIPTION OF THE DRAWINGS

The above, as well as additional objects, features and advantages of the present inventive concept, will be better understood through the following illustrative and non-limiting detailed description of preferred embodiments of the present inventive concept, with reference to the appended drawings, where like reference numerals will be used for like elements, wherein:

FIGS. 3-12 are side views of display assemblies according to various embodiments.

DETAILED DESCRIPTION OF PREFERRED EMBODIMENTS

Figure 1A:
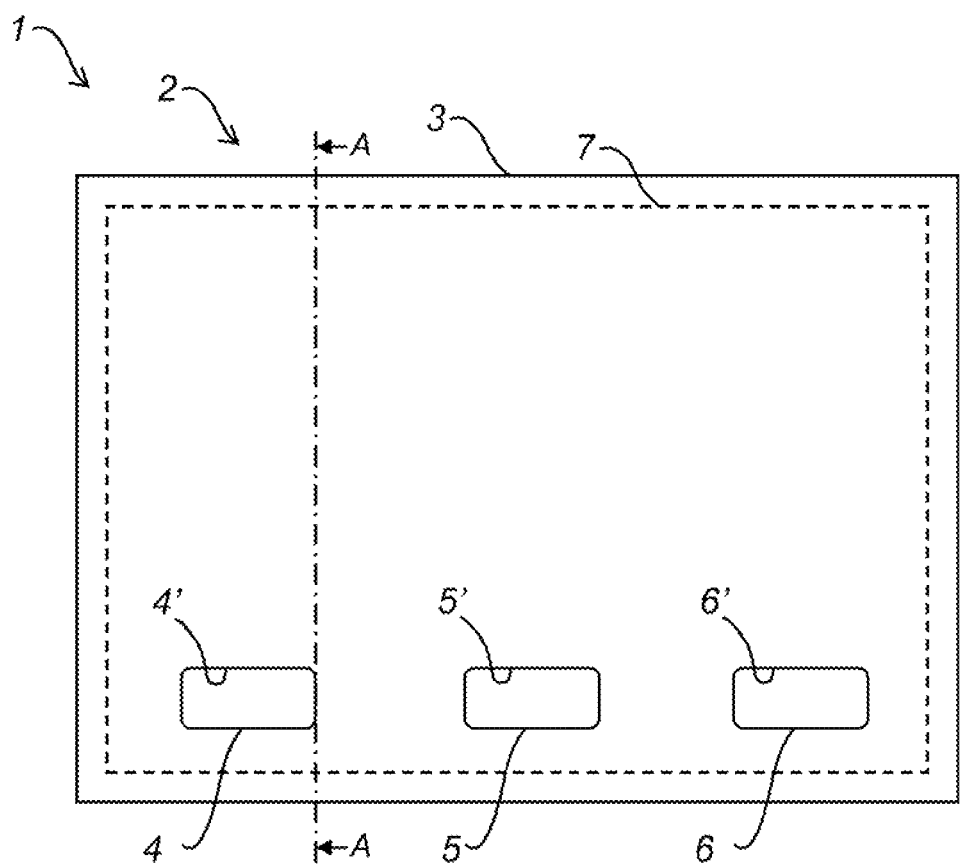
FIGS. 1a and 1b is a front view and a side view, respectively, of a display assembly according to an embodiment.

FIG. 1a illustrates a display assembly 1 according to an embodiment. The display assembly 1 may be arranged at a transaction terminal, a cash dispenser (e.g. an ATM), a ticket machine or the like at e.g. a train station or an airport. The display assembly 1 may also be arranged at a fuel dispensing unit at a petrol station.

The display assembly 1 comprises a substantially transparent, or transparent, screen 2. The display assembly 1 further comprises a display 7. The display 7 may be an LCD, a CRT display, a LED display or use any other type of known display technology.

Figure 1B:
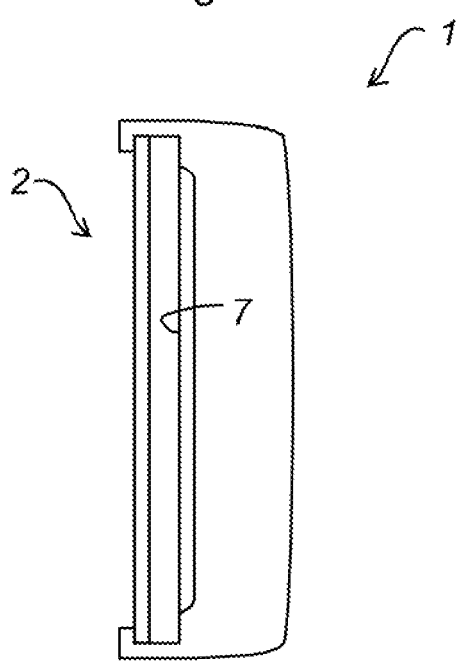

The screen 2 is arranged in front of the display 7. The screen 2 is thus arranged between the display 7 and an ambient environment such that the display 7 is visible through the screen 2. This is shown in FIG. 1b which is a schematic side view of the display assembly 1 according to this embodiment. The screen 2 is arranged at a distance from the display 7 such as 1 cm, 2.5 cm or wider. In FIG. 1b, the screen 2 extends in a plane which is parallel to the surface of the display 7. However, the screen 2 may also extend in a plane making an angle with the surface of the display 7. In FIGS. 1a and 1b the display assembly 1 is illustrated in a vertical orientation. The display assembly 1 may however be used also in other orientations, e.g. a horizontal orientation.

The screen 2 of this embodiment includes a first transparent screen portion 3. The first screen portion 3 is arranged at a fixed position in relation to the display 7. By way of example, the first screen portion 3 and the display 7 may be attached to a common supporting structure as illustrated in FIG. 1b. According to the present embodiment, "a fixed position" should be construed as a substantially fixed position in relation to the display 7, i.e. the first screen portion 3 may flex and/or yield somewhat if it is subjected to a sufficiently strong action. However, the position of the first screen portion 3 may be substantially unaffected if the first screen portion 3 is subjected to a pressing action from a finger of a user.

The screen 2 of the embodiment shown in FIG. 1a further includes a second transparent screen portion 4, a third transparent screen portion 5 and a fourth transparent screen portion 6. Each one of the second, the third and the fourth screen portions 4, 5, 6 are arranged in a respective opening of the first screen portion 3, the openings being defined by edges 4', 5', 6'. Each opening may e.g. be a cut out hole in the screen 2.

In FIG. 1a, the second, the third and the fourth screen portions 4, 5, 6 are rectangular. However, the screen portions 4, 5, 6 may present virtually any shape, e.g. triangular, circular, oval, star-shaped etc. The openings in the first screen portion 3 may present a corresponding shape.

The screen 2 and the portions 3, 4, 5, 6 thereof are substantially transparent. According to this embodiment, "substantially transparent" may be construed as a degree of transparence or translucence such that viewing of information presented on the display 7 through the screen 2 is allowed. Different degrees of transparency may be used depending on the context the display arrangement 1 is used in, the brightness of the display 7, and/or ambient light conditions. The screen 2 may be an uncolored transparent screen; however, a colored transparent screen may be also be used. The screen 2 may be made of durable, scratch resistant glass, a transparent plastic or thermoplastic, or the like.

Figures 2A, 2B:
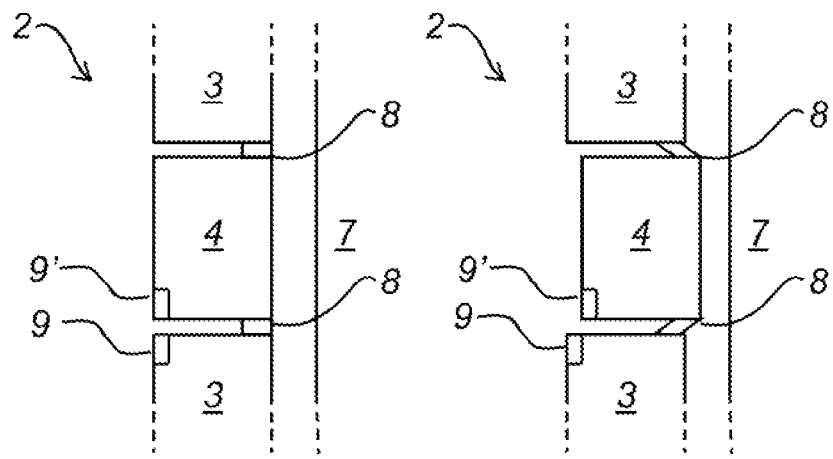
FIGS. 2a and 2b are side views of the display assembly according to an embodiment.

FIG. 2a is a magnified cross sectional view taken along line A-A in FIG. 1 illustrating the second screen portion 4 arranged in an opening of the first screen portion 3. In the following disclosure, reference will mainly be made to the second screen portion 4. However, the description applies correspondingly to the third and the fourth screen portions 5, 6.

To facilitate understanding, the width of the gap between the first and second screen portions has been exaggerated. In practice the second screen portion may present a much closer fit with the opening.

The second screen portion 4 in this embodiment is movably arranged in relation to the first screen portion 3. The second screen portion 4 is thus movable in relation to the first screen portion 3 by translation. The second screen portion 4 is movable between a first position (shown in FIG. 2a) and a second position (shown in FIG. 2b). The first and the second positions are distinct. The second position is closer to the display 7 than the first position. The second position may be such that the second screen portion 4 engages with the display 7. The second position may also be such that the second screen portion 4 does not engage with the display 7.

The second screen portion 4 is arranged to assume the first position during absence of a pressing action thereon, e.g. from a user. The first position may thus be referred to as an initial or a normal position of the second screen portion 4.

The second screen portion 4 is arranged to assume the second position when actuated by a pressing action thereon, e.g. from a user. As will be understood from the following, the second position may be referred to as an active or depressed position of the second screen portion 4.

The second screen portion 4 is shown attached to the first screen portion 3 via resilient means or one or more resilient members 8. The resilient means or members 8 may be glued to the first and the second screen portions 3, 4. The resilient member 8 may comprise a resilient silicone or rubber strip. Alternatively, the resilient member 8 may comprise one or more springs attached to the first and the second screen portions 3, 4. When the second screen portion 4 is in the second position the resilient member 8 may bring about a force restoring the second screen portion 4 to the first position once the user releases the second screen portion 4.

The resilient member 8 may be arranged at the two horizontally extending interfaces between the first screen portion 3 and the second screen portion 4. The resilient member 8 may also be arranged at the two vertically extending interfaces between the first screen portion 3 and the second screen portion 4. The resilient member 8 may also be arranged along the full circumference of the second screen portion 4.

In FIGS. 2a and 2b, the resilient member 8 is arranged flush with the surfaces of the first and the second screen portions 3, 4 facing the display 7. However, the resilient member 8 may also be arranged flush with the opposite surfaces of the first and the second screen portions 3, 4, i.e. the surfaces of the first and the second screen portions 3, 4 facing away from the display 7. The resilient member 8 may also be arranged anywhere between these positions.

The display assembly 1 may further comprise a detector. A separate detector may be provided for each one of the second, the third and the fourth screen portions 4, 5, 6. Each detector may be configured to provide a detection signal in response to the corresponding screen portion 4, 5, 6 assuming the second position, i.e. the active or depressed position. The detection signal may be provided to a controller of the display assembly 1 which, in response to receiving the detection signal, may perform an appropriate action.

The display 7 may be arranged to present information to a user. The specific information presented may depend on in what context the display assembly 1 is used. For example, if the display assembly 1 is arranged at a fuel dispensing unit the information may relate to available fuel types and/or grades at the fuel dispensing unit, fuel price information, account information etc.

The display 7 may present information prompting a user to make a first selection. A first option (e.g. "Select fuel type 1") may be presented in a region of the display 7 which is visible through the second view portion 4. A second option (e.g. "Select fuel type 2") may be presented in a region of the display 7 which is visible through the third view portion 5. A third option (e.g. "Cancel operation") may be presented in a region of the display visible through the fourth view portion 6. Once the user has made the selection by pressing the appropriate screen portion, the display 7 may present information prompting a user to make a further selection (e.g. "Confirm selection" or "Change selection"). The available options may be presented in the regions of the display 7 which are visible through the view portions 4, 5, 6, wherein the user may make a selection by pressing the appropriate screen portion. The second, the third and the fourth screen portions 4, 5, 6 may thus be used as buttons whose appearance and function may be changed in an interactive manner. Since the screen portions 4, 5, 6 are movably arranged, they may provide tactile feel for a user interacting with the display assembly 1. Furthermore, if no input is required from the user the regions of the display 7 visible through the screen portions 4, 5, 6 may be used for presenting other information. The entire display 7 may then be used for presenting information to the user without any "buttons" occupying the display surface.

According to the embodiment illustrated in FIGS. 2a and 2b, the detector for the second screen portion 4 comprises a magnetic switch 9 arranged at the interface between the first and the second screen portions 3, 4. The magnetic switch 9 may be arranged on the first screen portion 3. The magnetic switch 9 may be connected to the controller e.g. by thin copper wires arranged on the surface of the first screen portion 3 facing the screen 7. A permanent magnet 9' may be arranged on the second screen portion 4.

The permanent magnet 9' and the magnetic switch 9 may be arranged to be aligned when the second screen portion 4 is in the first position (FIG. 2a). As the second screen portion 4 is brought towards the second position, the separation between the permanent magnet 9' and the magnetic switch 9 increases wherein the magnetic field at the magnetic switch 9 caused by the permanent magnet 9' is weakened (FIG. 2b).

The magnetic switch 9 may be arranged to be open when the second screen portion 4 is in the first position. The magnetic switch 9 may be arranged to be closed when the second screen portion 4 is in the second position. Alternatively, the magnetic switch 9 may be arranged to be closed when the second screen portion 4 is in the first position and open when the second screen portion 4 is in the second position. In any case, the controller may determine the position of the second screen portion 4 based on the state of the magnetic switch 9.

Figures 3A, 3B:
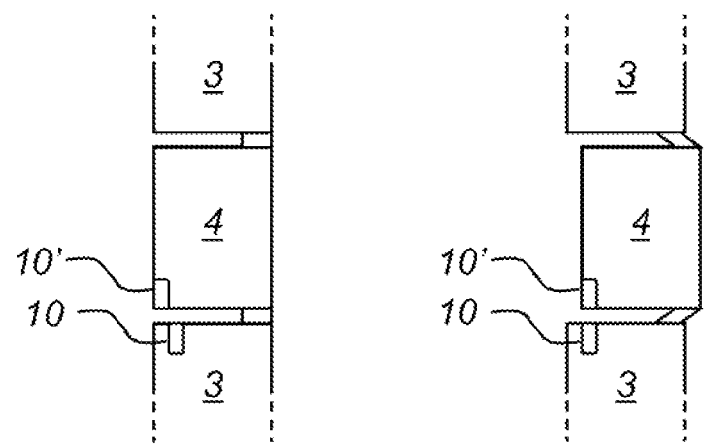

FIGS. 3a and 3b illustrate a magnetic switch arrangement according to a further embodiment. A magnetic switch 10 may be arranged on the first screen portion 3. A permanent magnet 10' may be arranged on the second screen portion 4. The permanent magnet 10' and the magnetic switch 10 are arranged to be out of alignment when the second screen portion 4 is in the first position (FIG. 3a). As the second screen portion 4 is brought towards the second position, the separation between the permanent magnet and the magnetic switch 9 decreases wherein the magnetic field at the magnetic switch 10 caused by the permanent magnet 10' is increased. The second position of the second screen portion 4 is such that the permanent magnet 10' and the magnetic switch 10 become aligned (FIG. 3b).

The magnetic switch 10 may be arranged to be open when the second screen portion 4 is in the first position. The magnetic switch 10 may be arranged to be closed when the second screen portion 4 is in the second position. Alternatively, the magnetic switch 10 may be arranged to be closed when the second screen portion 4 is in the first position and open when the second screen portion is in the second position. In any case, the separation between the first position and the second position of the second screen portion 4 is such that the state of the magnetic switch 10 changes when the second screen portion 4 is moved from the first/second position to the second/first position. The controller may thus determine the position of the second screen portion 4 based on the state of the magnetic switch 10.

Figures 4A, 4B:
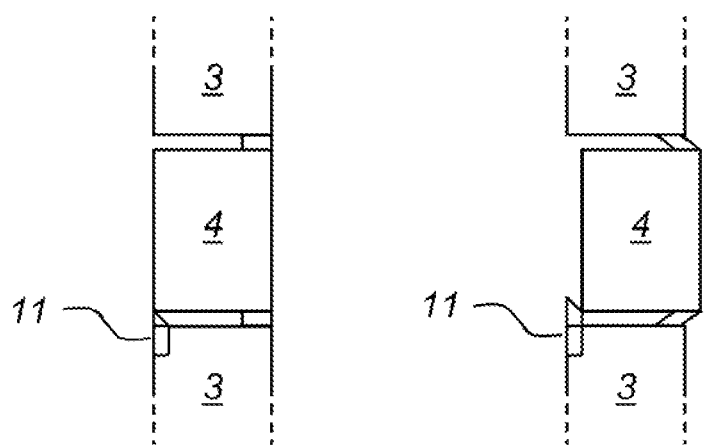

FIGS. 4a and 4b illustrate a detector for the second screen portion 4 according to a further embodiment. The detector comprises a switch 11 arranged at the interface between the first and the second screen portion 3, 4. The switch 11 comprises an actuator and is arranged such that the actuator is depressed when the second screen portion 4 is in the first position (FIG. 4a) and released when the second screen portion 4 is in the second position (FIG. 4b).

The switch 11 may be arranged to be open when the second screen portion 4 is in the first position. The switch 11 may be arranged to be closed when the second screen portion 4 is in the second position. Alternatively, the switch 11 may be arranged to be closed when the second screen portion 4 is in the first position and open when the second screen portion 4 is in the second position. The controller may thus determine the position of the second screen portion 4 based on the state of the switch 11.

FIGS. 5a and 5b illustrate an arrangement of the second screen portion 4 according to an alternative embodiment wherein the second screen portion 4 is pivotably arranged in relation to the first screen portion 3. The second screen portion 4 is thus movable in relation to the first screen portion 3 by rotation.

The first position corresponds to a non-tilted orientation in relation to the first screen portion 3 (FIG. 5a), and the second position corresponds to a tilted orientation in relation to the first screen portion 3 (FIG. 5b). In the second position, the second screen portion 4 is tilted towards the screen 7. The second screen portion 4 may be rotated in the horizontal plane, the vertical plane, or some other plane. As in the previous embodiments, the second screen portion 4 is arranged to assume the second position when actuated by a pressing action thereon, e.g. from a user.

The second screen portion 4 is attached to the first screen portion 3 via a resilient means or a resilient member 12. The resilient member 12 may be similar to the resilient member 8 described above and hence comprise a resilient silicone or rubber strip or one or more springs.

The resilient member 12 may be arranged at either one of the horizontally extending interface between the first screen portion 3 and the second screen portion 4. The resilient member 12 may also be arranged at either one of the vertically extending interfaces between the first screen portion 3 and the second screen portion 4. In any case, the resilient member 12 may allow the second screen portion 4 to be tilted towards the screen 7.

The controller may determine the position (i.e. orientation) of the second screen portion 4 in a manner similar to that described in connection with FIGS. 2-4. More specifically, a magnetic switch 13 may be arranged on the first screen portion 3 and a permanent magnet 13' may be arranged on the second screen portion 4. As the second screen portion 4 is brought to the second position (FIG. 5b) the magnetic field at the magnetic switch 13 caused by the permanent magnet is weakened wherein the state of the magnetic switch 13 may change. The controller may thus determine the position of the second screen portion 4 based on the state of the switch 13.

Alternatively, with reference to FIGS. 6a and 6b, a switch 14 may be arranged on the first screen portion 4, the switch 14 comprising an actuator and being arranged such that the actuator is depressed when the second screen portion 4 is in the first position (FIG. 6a) and released when the second screen portion 4 is in the second position (FIG. 6b). The controller may thus determine the position of the second screen portion 4 based on the state of the switch 14.

In FIGS. 2-6, the switches are arranged at the vertically lower interface between the first and the second screen portions 3, 4. However, the switches may also be arranged at the vertically upper interface between the first and the second screen portions 3, 4, or at some other interface between the first and second screen portions 3,4.

FIGS. 7a and 7b illustrate a detector according to a further embodiment. The detector comprises an optical switch assembly 15. The optical switch assembly 15 comprises a light source and a photo detector. The first position of the second screen portion 4 is such that it may allow a light beam to be transmitted between the light source and the photo detector. The second position of the second screen portion 4 is such that it may prevent the light beam to be transmitted between the light source and the photo detector.

More specifically, the light source is arranged to emit a light beam L. The light source may e.g. be a LED or a laser. The photo detector is arranged to receive the light beam L. The light source may be arranged to emit the light beam L along the surface of the screen 2 facing the display 7.

When the second screen portion 4 is in the first position the light beam L may reach the detector (FIG. 7a). However, when the second screen portion 4 is in the second position the light beam L is blocked by the second screen portion 4 (FIG. 7b). The photo detector may be arranged to provide a detection signal to the controller when the light beam L no longer is detected. The controller may thus determine the position of the second screen portion 4 based on the output from optical switch assembly 15.

In FIGS. 7a, and 7b the photo detector is arranged at a level below the level of the light source. However the opposite configuration may also be used, i.e. with the photo detector above the light source.

As an alternative to the configuration shown in FIGS. 7a and 7b, an optical switch assembly may be arranged to transmit a light beam in a plane extending in parallel with and through the screen 2. When the second screen portion 4 is in the first position a part of the light beam may reach the photo detector. However when the second screen portion 4 assumes the second position, the transmission losses at the interfaces between the first and the second screen portions 3, 4 changes wherein the output from the photo detector may change. The controller may thus determine the position of the second screen portion 4 based on the output from optical switch assembly 15.

The optical switch assemblies described above may also be used in combination with the arrangements shown in FIGS. 2-4 wherein the second screen portion 4 is movable by translation.

Although in the above, reference has been made to a second, a third and a fourth screen portion 4, 5, 6, i.e. the three screen portions which are movably arranged in relation to the first screen portion 2, the inventive concept is not limited to this specific number of movably arranged screen portions. In fact, the screen may include only one or two such screen portions or more than three such screen portions, as suitable in the context that the display assembly 1 is used.

FIGS. 8a and 8b illustrate a display assembly 20 in accordance with a further embodiment. The display assembly 20 is similar to the display assembly 1 described above, however it differs from the display assembly 1 in that the display assembly 20 comprises a touch sensitive display 21. The display 21 may for example be a capacitive touch display or a resistive touch display.

The second screen portion 4 of the screen 2 may assume a first, initial position (FIG. 8a) and a second, depressed position (FIG. 8b). In FIGS. 8a and 8b the second screen portion 4 is movably arranged in relation to the first screen portion in the translational manner. The second screen portion 4 may however also be arranged in the rotational manner as described in connection with e.g. FIGS. 5a and 5b. In any case the second position may be such that the second screen portion 4 engages with the display 21. The display 21 may be configured to detect an engagement with the second screen portion 4. A user may thus interact with the display assembly 20 by pushing the second screen portion 23 until it makes contact with the display 21.

Alternatively, the display 21 may be configured to detect an electric coupling between an object touching the second screen portion 4 and the display 21. In the following, the object will be a finger of a user pressing the second screen portion 4; however, the object may be some other object a user may use for pressing the second screen portion 4 (e.g. a coin, a key, the tip of a nozzle of a fuel dispensing unit etc.)

When the second screen portion 4 is in the first position the electrical coupling to the finger may be relatively weak. As the second screen portion 4 approaches the display 21, through the actuation of the finger, the coupling may increase. The display 21 may be configured to generate a detection signal, i.e. determine that an input has been received, in response to the strength of the electric coupling exceeding a threshold. The second position of the second screen portion 4 may thus be chosen as the position where the electrical coupling to the display 21 exceeds the threshold. Especially, the second position may be such that the second screen portion 4 does not engage with the display 21. The user may hence interact with the display assembly 20 without being required to bring the second screen portion 4 into engagement with the display 21.

To increase the sensitivity of the detection, the second screen portion 4 may be provided with a conductor wherein the display 21 may be configured to detect an electric coupling between the conductor and the display 21. The conductor may e.g. be a conductive layer provided on a surface of the second screen portion 4, e.g. the surface facing the display 21. To keep the conductive layer from obstructing viewing through the second screen portion 4, the conductive layer may be formed as a relatively small conductive patch or dot.

In the following, a number of alternative designs of first and second screen portions will be presented with reference to FIGS. 9-12 which may be used in combination with any of the above-mentioned detection and display techniques. The second screen portions may be movably arranged in relation to the first screen portion in either a translational manner or in a rotational manner as described above.

According to one design, the second screen portion of the transparent screen may present a first dimension at a first location along the second screen portion and a corresponding second dimension at a second location along the second screen portion, the second location being at a larger distance from the surface of the second screen portion facing the display than the first location, wherein the first dimension is larger than the second dimension. The opening of the first screen portion may present a corresponding design. The first and second dimensions may correspond to a height of the second screen portion. The first and second dimensions may also correspond to a width of the second screen portion.

FIG. 9 illustrates a screen presenting such a design wherein the second screen portion 31 is tapered. The second screen portion 31 may be tapered in either one or both of its height or width dimension. The edges of the openings of the first screen portion 30 may be correspondingly shaped. In case the second screen portion 31 presents a circular cross section, the shape of the second screen portion 31 may be described as a frusto-conical shape.

FIG. 10 illustrates another screen presenting such a design wherein the second screen portion 33 includes a brim 33'. The brim 33' is arranged at the side of the second screen portion 33 facing the display. The edges of the openings of the first screen portion 32 may be correspondingly shaped.

These designs may prevent the second screen portions 31, 33 from being pulled out of the opening from the front side of the display arrangement.

FIG. 11 illustrates a first transparent screen portion 34 and a second transparent screen portion 35 of a further alternative design. According to this design, the second screen portion 35 presents a thickness exceeding a thickness of the first screen portion 34. The first and the second screen portions 34, 35 may be arranged flush either at the side facing the display or at the side facing away from the display or at none of these sides, which is the case in FIG. 11.

FIG. 12 illustrates a first transparent screen portion 36 and a second transparent screen portion 37 of a further alternative design. According to this design, the second screen portion 37 presents a thickness which is less than a thickness of the first screen portion 36. The first and the second screen portions 36, 37 may be arranged flush either at the side facing the display or at the side facing away from the display or at none of these sides, which is the case in FIG. 12.

Figure 13:
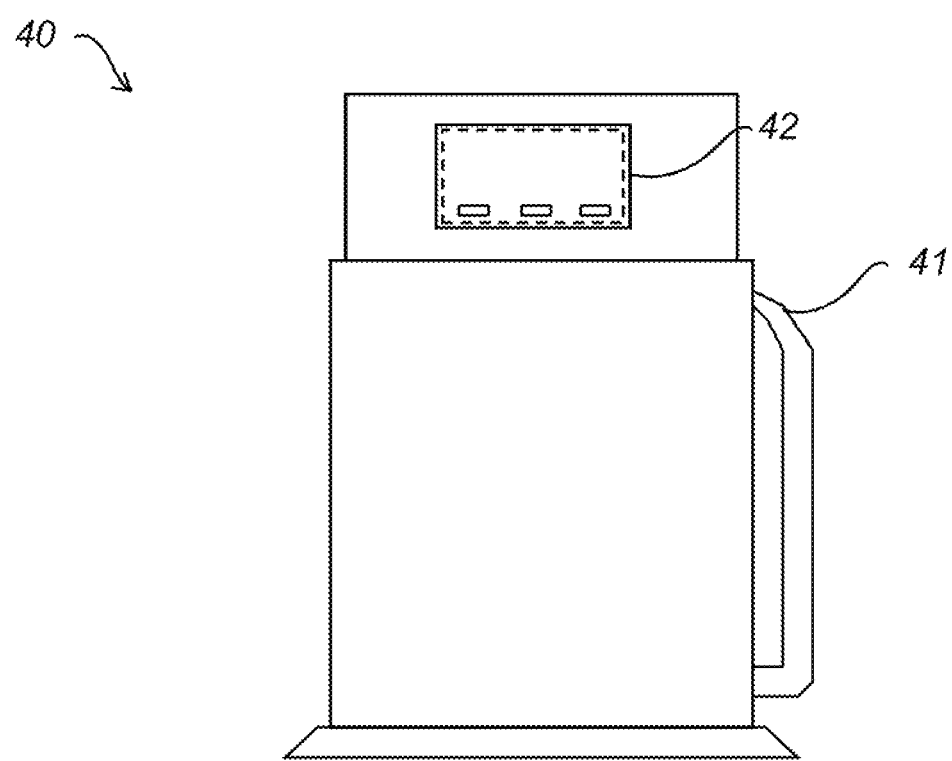
FIG. 13 schematically illustrates a fuel dispensing unit according to an embodiment.

FIG. 13 illustrates an embodiment of a fuel dispensing unit 40. The fuel dispensing unit 40 comprises a nozzle 41 for dispensing fuel. The fuel dispensing unit further comprises a display assembly 42 in accordance with any one of the display assemblies described with reference to FIGS. 1-12.

In the above, the invention has mainly been described with reference to a few embodiments. However, as is readily appreciated by a person skilled in the art, other embodiments than the ones disclosed above are equally possible within the scope of the inventive concept, as defined by the appended claims.

The invention claimed is:

1. A display assembly for a fuel dispensing unit, said display assembly comprising:
   a display mounted on the fuel dispensing unit;
   a substantially transparent screen arranged between the display and an ambient environment such that the display is visible through the screen, the substantially transparent screen comprising a first screen portion and a second screen portion that is arranged to move relative to the first screen portion between a first position and a second position that is distinct from the first position; and
   a detector coupled with the substantially transparent screen proximate a side of the transparent screen that is closer to the ambient environment than the display, the detector comprising a first part and a second part disposed, respectively, on the first screen portion and the second screen portion,
   wherein the first part and the second part of the detector cooperate to identify the position of the second screen portion relative to the first screen portion.

2. A display assembly according to claim 1, wherein the first screen portion comprises an opening in which the second screen portion is arranged.

3. A display assembly according to claim 1, wherein the second screen portion is arranged to be movable towards the display.

4. A display assembly according to claim 1, wherein the second screen portion is pivotably arranged in relation to the first screen portion.

5. A display assembly according to claim 1, wherein the detector is configured to provide a signal in response to the second screen portion assuming the second position.

6. A display assembly according to claim 1, wherein the detector comprises a switch for cooperation with the second screen portion.

7. A display assembly according to claim 6, wherein one of the first part and the second part comprise the switch.

8. A display assembly according to claim 1, wherein the detector comprises a magnetic switch arranged as one of the first part and the second part on the first screen portion and the second screen portion.

9. A display assembly according to claim 1, wherein the detector comprises an optical switch assembly.

10. A display assembly according to claim 1, wherein the display is a touch sensitive display.

11. A display assembly according to claim 10, wherein the second position is such that the second screen portion engages with the display and the display is configured to detect an engagement with the second screen portion.

12. A display assembly according to claim 10, wherein the display is configured to detect an electric coupling between an object touching the second screen portion and the display.

13. A display assembly according to claim 10, wherein the second screen portion comprises a conductor and the display is configured to detect an electric coupling between the conductor and the display.

14. A fuel dispensing unit comprising:
a nozzle for dispensing fuel, and
a display assembly, comprising:
  a display,
  a substantially transparent screen arranged between the display and an ambient environment such that the display is visible through the screen, the substantially transparent screen comprising a first screen portion and a second screen portion that is arranged to move, relative to the first screen portion, between a first position and a second position that is distinct from the first position, and
  a detector coupled with the substantially transparent screen proximate a side of the transparent screen that is closer to the ambient environment than the display, the detector comprising a first part and a second part disposed, respectively, on the first screen portion and the second screen portion,
  wherein the first part and the second part cooperate to identify the position of the second screen portion relative to the first screen portion.

* * * * *